UNITED STATES PATENT OFFICE.

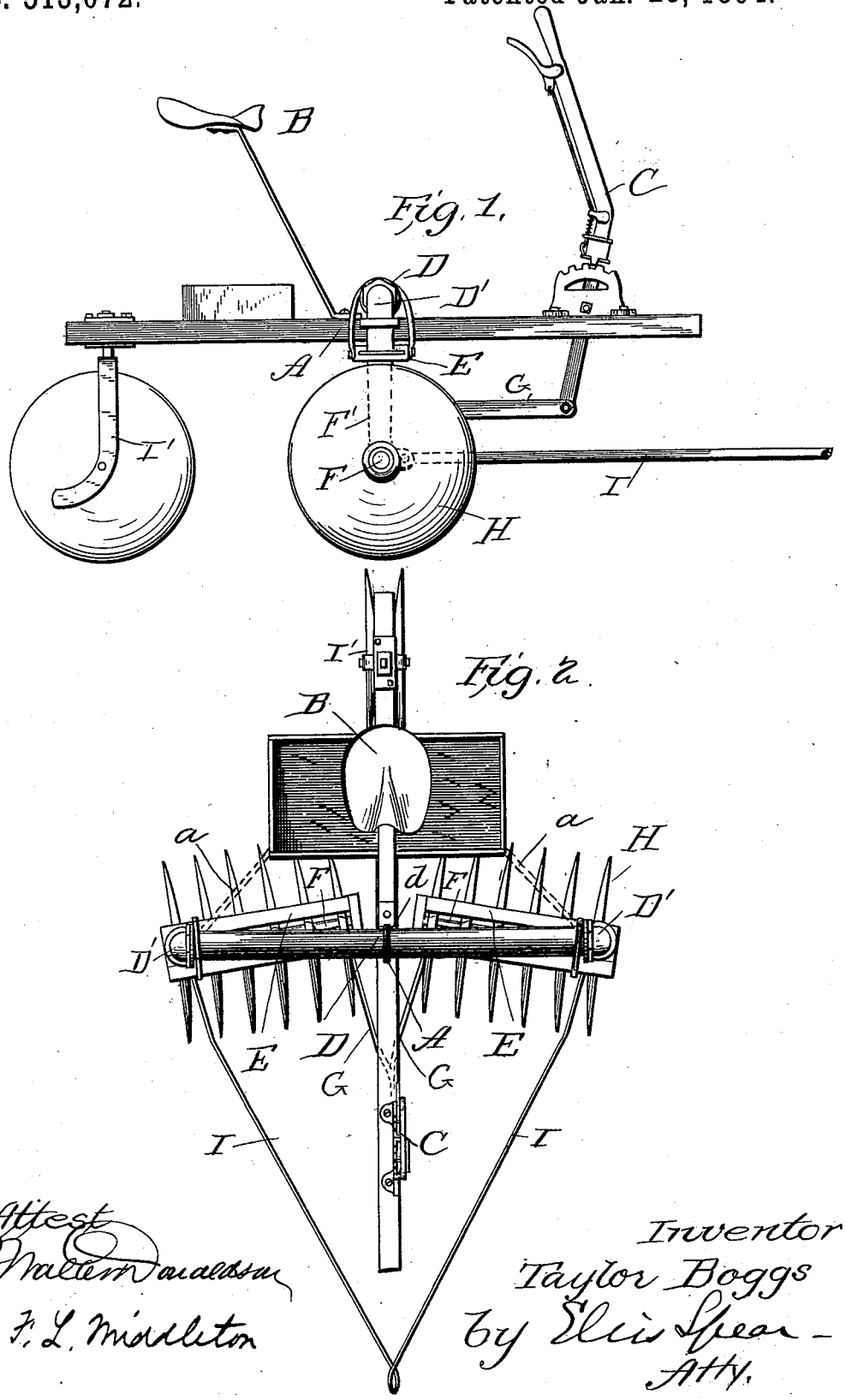

TAYLOR BOGGS, OF CHILLICOTHE, OHIO.

DISK HARROW.

SPECIFICATION forming part of Letters Patent No. 513,072, dated January 23, 1894.

Application filed November 28, 1892. Serial No. 453,335. (No model.)

*To all whom it may concern:*

Be it known that I, TAYLOR BOGGS, a citizen of the United States of America, residing at Chillicothe, in the county of Ross and State of Ohio, have invented certain new and useful Improvements in Disk Harrows, of which the following is a specification.

The object of the present invention is to provide an improved disk harrow which will obviate the necessity of having a tongue connected thereto, and to add to the ease with which it may be drawn and guided, and a further object is to form the rear guide and support in such form as will coact with or supplement the action of the disks of the harrow.

The invention is illustrated in the accompanying drawings in which—

Figure 1 is a side elevation of my improved harrow, and Fig. 2 is a plan view of the same.

In the figures A, represents the main portion of the frame of the harrow upon which is mounted the seat B, and the operating handle C, and to which is also secured the cross bar D, of the frame, at right angles to the portion A. The part A, is preferably formed of a bar of wood, and the part D, rests upon and crosses the same, being secured thereto by a clevis $d$, and by the two brace rods $a, a$, which connect the outer ends of the bar D, with the rear end of the bar A. I prefer to make the bar D, of heavy iron pipe as shown, having elbow portions D' at each end which extend downward, and to which are pivotally connected the outer ends of the skeleton bars E. These skeleton bars, of which there are two, corresponding to the axles F, are provided with downwardly extending brackets or projections F', which are secured to or mounted upon the axles F, near each end thereof. It will thus be seen that the axles, together with the bars E, to which they are connected, are independent of each other, and are supported or held pivotally at their outer ends. Their inner ends are connected by means of rods G, with the lower end of a hand operated lever C, of substantially the ordinary and well known form, by means of which the inner ends of the axles may be advanced or thrown back to set them at any angle to each other. The disks H, journaled upon the axles are of the ordinary or any desired form.

To the axle near each end are secured the ends of the rods I, which unite at a point some distance in front of the harrow, and to these rods at the point of junction is secured the doubletree by which the horses are connected to the harrow. As this means of connection dispenses with the use of a tongue it is necessary to provide a support and guide in rear of the harrow, and this I provide in the form of a double disk, or a wheel formed of two disks connected together, and journaled in a fork pivoted to the rear end of the frame A as shown at I'. This double disk is thus adapted to serve as a follower and to guide and support the rear end of the harrow.

When the two rows of disks are set at an angle to each other, in which position they operate most effectively, there is a space between the two inner disks, and consequently there will be a strip of ground unoperated upon by the two inner disks. This has been an objectionable feature to so many of the machines heretofore used.

In the present machine it will be observed that the follower disk is directly in line with this space, and the strip left unoperated upon by the main disks will be cultivated by the disks of the follower wheel, and thus the work is thoroughly and effectively done.

I claim as my invention—

In a disk harrow a frame comprising the transverse iron pipe having downwardly extending end portions and the longitudinal bar secured to said pipe, the skeleton bars having downwardly extended ends with their outer ends pivotally connected to the downwardly extending ends of the transverse pipe, axles carrying disks journaled between the downwardly extending ends of the skeleton bars, adjustable connections from the inner ends of the skeleton bars to the longitudinal bar, draw rods connected to the ends of the transverse pipe, and a pair of follower disks for supporting the rear end of the longitudinal bar, substantially as described.

In testimony whereof I affix my signature in presence of witnesses.

TAYLOR BOGGS.

Witnesses:
Z. F. DOUNS,
MARCUS BOGGS,
JOHN C. ENTREKIN.